United States Patent
Sato

(10) Patent No.: US 6,490,128 B1
(45) Date of Patent: Dec. 3, 2002

(54) THIN-FILM DEVICE WITH IMPROVED COHESION AND ELECTRICAL CONDUCTANCE BETWEEN ELECTRICALLY CONDUCTIVE THIN-FILM AND ELECTRICAL CONDUCTOR IN CONTACT THEREWITH, AND MANUFACTURING METHOD THEREFOR

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/569,260

(22) Filed: May 11, 2000

(30) Foreign Application Priority Data

May 13, 1999 (JP) ............................................ 11-132603

(51) Int. Cl.[7] .............................. G11B 5/31; G11B 5/17
(52) U.S. Cl. ........................................ 360/126; 360/123
(58) Field of Search ................................ 360/123, 124, 360/125, 126, 317, 318, 318.1; 174/256, 257; 29/603.23, 603.24, 603.25, 603.26; 361/751; 428/209, 615, 901

(56) References Cited

U.S. PATENT DOCUMENTS

| | | | |
|---|---|---|---|
| 4,760,481 A | * 7/1988 | Yuito et al. | .................. 360/123 |
| 4,949,209 A | 8/1990 | Imanaka et al. | |
| 5,065,270 A | * 11/1991 | Koyanagi et al. | ........... 360/123 |
| 5,126,901 A | 6/1992 | Momoi et al. | |
| 5,617,275 A | 4/1997 | Ogura et al. | |
| 5,738,931 A | * 4/1998 | Sato et al. | .................. 174/256 |

FOREIGN PATENT DOCUMENTS

JP          4-89609       *  3/1992

* cited by examiner

*Primary Examiner*—David L. Ometz
(74) *Attorney, Agent, or Firm*—Brinks Hofer Gilson & Lione

(57) ABSTRACT

A coil layer as an electrically conductive thin-film of a thin-film device comprises a copper layer as an electrically conductive material layer and a nickel layer as an electrically conductive protective layer composed of a material, in which an oxide layer formed on the material grows to a thickness of not more than a predetermined thickness. Consequently, the thickness of the oxide layer can be predicted and the oxide layer can be reliably removed by ion-milling or the like.

7 Claims, 7 Drawing Sheets

THIN-FILM DEVICE WITH IMPROVED COHESION AND ELECTRICAL CONDUCTANCE BETWEEN ELECTRICALLY CONDUCTIVE THIN-FILM AND ELECTRICAL CONDUCTOR IN CONTACT THEREWITH, AND MANUFACTURING METHOD THEREFOR

BACKGROUND OF THE INVENTION

1. Field of the Invention

The present invention relates to a thin-film device having an electrically conductive thin-film, such as a coil layer, and an electrical conductor, such as a lead layer and a bump, which are in contact with the surface of the electrically conductive thin-film, and more particularly, relates to a thin-film device in which contact failures can be reduced and stability of direct current resistance can be improved by improving cohesion and electrical conduction between the electrically conductive thin-film and the electrical conductor, and relates to a manufacturing method therefor.

2. Description of the Related Art

FIG. 10 is a cross-sectional view of a conventional magnetoresistive (MR)/inductive hybrid head. In a reading MR thin-film magnetic head h1 of the MR/inductive hybrid head, an alumina undercoat film 1a is formed on a slider 1 composed of alumina-titanium-carbide, and a laminated structure, which is composed of a lower shield layer 2, a lower gap layer 3, an MR element layer 4, an electrode layer 5, an upper gap layer 6, and an upper shield layer 7, is formed on the alumina undercoat layer 1a.

A recording inductive head h2 provided on the reading MR thin-film magnetic head h1 is a laminated structure composed of a lower core layer 7 which is also used as the upper shield layer 7, a gap layer 8a, an insulating layer 8b, a coil layer 9, an insulating layer 10, an upper core layer 11, a lead layer 12, and an insulating layer 13. A front end of the gap layer 8a, which is disposed between the lower core layer 7 and the upper core layer 11 and opposes a recording medium, forms a magnetic gap G.

The lead layer 12 is in contact with an electrode for an external connection composed of a bump 15 and a bonding pad 16 at the other edge of the lead layer 12, which is opposite to the edge thereof in electrical contact with a central edge 9a of the coil layer 9, via an elevating layer 14 made of the same material as was used for the coil layer 9.

FIG. 11 is an enlarged partial cross-sectional view of a contact area between the coil layer 9 and the lead layer 12 of the inductive head h2 for recording data on a magnetic recording medium.

The coil layer 9 as an electrically conductive thin-film is composed of a copper layer 9c as an electrically conductive material layer formed by flame plating above the insulating layer 8b, which is provided on the gap layer 8a of the inductive head h2, via a coil base layer 9b composed of titanium and copper. The coil layer 9 is flatly coiled on the insulating layer 8b. The lead layer 12, which is an electrical conductor, is formed above the coil layer 9 via the insulating layer 10. The lead layer 12 is formed by plating using permalloy. The coil layer 9 and the lead layer 12 are in electrical contact with each other at the central edge 9a of the coil layer 9.

FIGS. 12 to 17 are cross-sectional views of the inductive head h2 of the MR/inductive hybrid thin-film magnetic head shown in FIG. 10 in a manufacturing process therefor.

FIG. 12 shows a state of the insulating layer 8b composed of a hard-baked resist formed on the gap layer 8a composed of $Al_2O_3$, $SiO_2$, or the like provided on the lower core layer 7.

FIG. 13 shows a state of the coil base layer 9b in a laminated structure composed of titanium and copper formed on the insulating layer 8b by a vacuum film deposition process, such as sputtering, and the copper layer 9c of the electrically conductive material layer formed on the coil base layer 9b by flame plating. The copper layer 9c is flatly formed in the form of a coil on the coil base layer 9b.

In addition, the coil base layer 9b exposed by the copper layer 9c is removed by dry-etching such as by ion-milling using argon ions, and as a result, the coil layer 9 composed of the coil base layer 9b and the copper layer 9c is formed as shown in FIG. 14.

Next, as shown in FIG. 15, the insulating layer 10 is formed on the coil layer 9. In this step, an opening 10a is formed in the insulating layer 10 at the position at which the central edge 9a of the coil layer 9 is present.

As shown in FIG. 16, a plating base layer 17 (not shown in FIGS. 10 and 11) to form the upper core layer 11 and the lead layer 12 by plating is formed on the insulating layer 10 by sputtering. The plating base layer 17 is made of, similarly to the upper core layer 11 and the lead layer 12, permalloy or the like. In this step, the surface of the central edge 9a of the coil layer 9 in the opening 10a is covered with the plating base layer 17.

In addition, the upper core layer 11 and the lead layer 12 are simultaneously formed on the plating base layer 17 by plating using permalloy, and the surfaces of the upper core layer 11 and the lead layer 12 are covered with the insulating layer 13. A front end of the gap layer 8a, which is disposed between the lower core layer 7 and the upper core layer 11 and opposes a recording medium, forms the magnetic gap G. FIG. 17 is a cross-sectional view of the completed inductive head h2 in a laminated structure.

In the conventional inductive head h2 described above, in the step for removing the coil base layer 9b exposed by the copper layer 9c, as shown in FIG. 13, by ion-milling or the like, the upper surface of the copper layer 9c is polished, as is the coil base layer 9b. When the upper surface of the copper layer 9c is polished, direct current resistance of the coil layer 9 varies, and hence, there is a problem in that product characteristics of the manufactured inductive head h2 are degraded. In addition, when ion-milling is performed, bombardment by argon ions on the upper surface of the copper layer 9c may cause damage, such as residual stress in the copper layer 9c, and hence, there is also a problem in that direct current resistance of the coil layer 9 varies.

Furthermore, between the formations of the coil layer 9 and the insulating layer 10, the coil layer 9 is exposed to the air in some cases as shown in FIG. 14. In addition, the central edge 9a of the coil layer 9 is exposed in the opening 10a in the insulating layer 10 in the state of the insulating layer 10 formed as shown in FIG. 15, and accordingly, the central edge 9a of the coil layer 9 may be exposed to the air until the plating base layer 17 is formed so as to cover the upper surface of the central edge 9a in the opening 10a of the insulating layer 10.

When the coil layer 9 is exposed to the air, the surface of the coil layer 9, which is an electrically conductive thin-film, is oxidized, and the oxide layer forms. In particular, when the insulating layer 10 is heat-cured to planarize the surface thereof, the central edge 9a of the coil layer 9 in the opening 10a is exposed to the air, and hence, is susceptible to forced oxidation.

In the case in which the surface of the coil layer 9 is oxidized, i.e., in which the oxide layer forms thereon, cohesion between the coil layer 9 and the insulating layer 10 formed thereon, and between the coil layer and the lead layer 12 are degraded, and separation thereof readily occur. In particular, in the case in which the central edge 9a of the coil layer 9, which is in contact with the lead layer 12, is oxidized, degradation in electrical conduction as well as the degradation in the cohesion with the lead layer 12 occurs. Consequently, the direct current resistance of the inductive head h2 becomes unstable and recording characteristics thereof are degraded.

When the oxide layer forms on the coil layer 9, there are methods for removing the oxide layer by dry etching, such as by ion-milling. However, the thickness of the oxide layer formed on the surface of the coil layer 9, that is, the copper layer 9c, varies in accordance with the conditions when the oxide layer forms, and the thickness of the oxide layer formed on the coil layer 9 cannot be predicted.

Consequently, when the conditions for ion-milling are determined so as to remove a predetermined thickness of the oxide layer formed on the coil layer 9, products having remaining oxide layer may be manufactured, or conversely, an area of the coil layer 9, which is not oxidized, may be removed. Accordingly, there is a problem in that characteristics of the thin-film structures vary from product to product. It is not practical to vary the conditions for ion-milling in accordance with the respective measured thickness of the oxide layer formed on the coil layer 9 during manufacturing.

Degradation in cohesion between an electrically conductive thin-film and an insulating layer formed thereon, and degradations in cohesion and electrical conduction between the electrically conductive thin-film and an electrical conductor in contact therewith, caused by oxidation of the electrically conductive thin-film, such as a coil layer, in manufacturing steps, are problems not only in the thin-film magnetic heads, but also in thin-film inductors, thin-film transistors, and general thin-film devices.

SUMMARY OF THE INVENTION

In order to solve the conventional problems described above, it is an object of the present invention to provide a thin-film device and a manufacturing method therefor, in which an oxide layer formed on an electrically conductive thin-film, such as a coil layer of a thin-film device, can be reliably removed, and cohesion and electrical conduction between the electrically conductive thin-film and an electrical conductor in contact therewith can be improved. Consequently, connection failures in the thin-film device can be reduced, and stability of direct current resistance thereof can be improved.

A thin-film device of the present invention comprises an electrically conductive thin-film and an electrical conductor in contact therewith, in which the electrically conductive thin-film has an electrically conductive material layer and an electrically conductive protective layer having a predetermined thickness formed on the electrically conductive material layer.

The electrically conductive thin-film forming a coil layer and the like of the thin-film device of the present invention has a structure provided with the electrically conductive material layer protected by the electrically conductive protective layer. Consequently, in a step of removing an unwanted coil base layer by dry etching, such as by ion-milling, when the coil layer is formed, removal of the upper surface of the electrically conductive material layer in addition to that of the coil base layer can be avoided.

Accordingly, change in the volume of the electrically conductive material layer can be prevented. Since the volume of the electrically conductive material layer is a parameter determining allowable current and direct current resistance of the electrically conductive thin-film, and since a change in the volume of the electrically conductive material layer can be prevented, a thin-film device can be easily provided with the electrically conductive thin-film having uniform allowable current and direct current resistance, and uniform characteristics in the thin-film device be easily obtained.

In addition, when ion-milling is performed, bombardment by argon ions on the upper surface of the electrically conductive material layer can be prevented, and hence, damage such as residual stress in the upper surface of the electrically conductive material layer can be avoided. Accordingly, in the present invention, the thin-film device having uniform direct current resistance can be obtained.

The electrically conductive protective layer preferably comprises a material, in which an oxide layer formed on the material grows to a thickness of not more than that of the electrically conductive protective layer. The electrical conductor is preferably in contact with an area at which the oxide layer on the electrically conductive protective layer is removed therefrom.

When the electrically conductive protective layer comprises the material described above, the oxide layer formed on the material at room temperature or an elevated temperature grows to a thickness of not more than the electrically conductive protective layer. Consequently, even though the oxide layer is formed on the electrically conductive protective layer, when not less than the maximum thickness of the oxide layer grown on the surface of the electrically conductive protective layer is polished away therefrom by dry etching, such as by ion-milling, the oxide layer can be reliably removed.

In the thin-film device of the present invention, since the electrical conductor, such as a lead layer or the like, is in contact with the area at which the oxide layer on the electrically conductive protective layer is removed, the cohesion and electrical conduction between the electrically conductive thin-film and the electrical conductor can be improved. Accordingly, connection failures of the thin-film device can be reduced. In addition, the direct current resistance of the thin-film device can be stabilized, and the characteristic thereof can be improved.

When the electrically conductive protective layer having a predetermined thickness of the thin-film device of the present invention comprises the material, in which the oxide layer formed thereon at room temperature or an elevated temperature grows to a thickness of not more than that of the electrically conductive protective layer, the oxide layer on the surface of the electrically conductive protective layer can be removed by ion-milling or the like so as to only polish the electrically conductive protective layer without polishing the electrically conductive material layer. Consequently, a change in the volume of the electrically conductive material layer is prevented, and hence, a thin-film device provided with the electrically conductive thin-film having uniform allowable current and direct current resistance can be formed.

The electrically conductive material layer and the electrically conductive protective layer must be formed at sufficient thicknesses so as to increase allowable current and so as to decrease direct current resistance. Hence, the electrically conductive material layer and the electrically conductive protective layer are preferably formed by plating.

The electrically conductive material layer is preferably an electrically conductive non-magnetic layer comprising at least one layer containing at least one element selected from copper and silver. The electrically conductive protective layer is preferably an electrically conductive non-magnetic layer comprising at least one layer containing at least one element selected from the group consisting of nickel, phosphorus, palladium, platinum, boron, and tungsten.

It has been experimentally confirmed that the oxide layer formed on the materials mentioned above used for the electrically conductive protective layer does not exceed a certain thickness at room temperature or an elevated temperature.

For example, when the electrically conductive protective layer is a nickel layer, and when an oxide layer forms on the electrically conductive protective layer, it has been experimentally confirmed that the oxide layer does not exceed approximately 3.0 nm from the surface of the electrically conductive protective layer. As a result, by polishing away not less than 3.0 nm of the electrically conductive protective layer from the surface thereof by dry etching, such as by ion-milling, the oxide layer can be reliably removed.

In addition, allowable current and direct current resistance of the electrically conductive thin-film are also determined by a material used for the electrically conductive material layer. In the case in which the electrically conductive material layer is an electrically conductive non-magnetic layer comprising at least one layer containing at least one element selected from copper and silver, an electrically conductive thin-film having low direct current resistance and high allowable current can be formed.

When a coil layer for a thin-film device or the like is formed by using the electrically conductive thin-film of the present invention, and when an electrically conductive material layer and an electrically conductive protective layer, which form the electrically conductive thin-film, are made of the electrically conductive non-magnetic material, such as nickel or copper, an influence to impedance of the coil layer can be prevented.

When the electrically conductive material layer is an electrically conductive non-magnetic layer comprising at least one layer containing at least one element selected from copper and silver, and the electrically conductive protective layer is an electrically conductive non-magnetic layer comprising at least one layer containing at least one element selected from the group consisting of nickel, phosphorus, palladium, platinum, boron, and tungsten, stress can be reduced when the electrically conductive thin-film is formed by providing the electrically conductive protective layer on the surface of the electrically conductive material layer. As a result, the electrically conductive material layer and the electrically conductive protective layer are difficult to separate from each other.

The electrically conductive protective layer may be formed on the entire surface of the electrically conductive material layer, and accordingly, the entire surface of the electrically conductive material layer can be protected.

However, in the case in which an insulating layer having an opening covering the electrically conductive thin-film is provided, the electrically conductive protective layer may be formed on the electrically conductive material layer only at an area thereof exposed in the opening provided in the insulating layer.

Since the electrical conductor is in contact with the surface of the electrically conductive thin-film only at the area thereof exposed in the opening in the insulating layer, even when the oxide layer present only in the opening of the insulating layer is reliably removed, the cohesion and electrical conduction between the electrically conductive thin-film and the electrical conductor can be improved, and the direct current resistance of the thin-film device can be stabilized.

In the thin-film device of the present invention, for example, the electrically conductive thin-film is a coil layer and/or a lead portion integrally extending from the coil layer in a thin-film magnetic head comprising a core layer to form a gap at an area thereof opposing a recording medium and the coil layer flatly coiled to induce a recording magnetic field to the core layer, and the electrical conductor is in contact with the coil layer and/or the lead layer.

A method for manufacturing a thin-film device of the present invention comprises a step (a) of forming an electrically conductive material layer by plating, a step (b) of forming an electrically conductive protective layer having a predetermined thickness by plating using a material on the electrically conductive material layer, in which an oxide layer formed on the material grows to a thickness of not more than a predetermined thickness at room temperature or an elevated temperature, a step (c) of removing the oxide layer on the surface of the electrically conductive protective layer; and a step (d) of forming an electrical conductor on the surface of the electrically conductive protective layer at which the oxide layer is removed.

According to the method for manufacturing the thin-film device of the present invention, the electrically conductive protective layer having a predetermined thickness is formed by using the material, in which the oxide layer on the surface of the material grows to a thickness of not more than a predetermined thickness at room temperature or an elevated temperature. Consequently, even though the oxide layer forms on the surface of the electrically conductive protective layer following the step (b), the oxide layer can be reliably removed by polishing away not less than the maximum thickness of the oxide layer grown from the surface of the electrically conductive protective layer by dry etching, such as by ion-milling with argon ions in the step (c).

Furthermore, in the step (d), the electrical conductor, such as a lead layer, is formed on the surface of the electrically conductive protective layer at an area thereof at which the oxide layer is removed, and hence, the cohesion and electrical conduction between the electrically conductive thin-film composed of the electrically conductive material layer and the electrically conductive protective layer and the electrical conductor can be improved. Accordingly, connection failures of the thin-film device can be reduced. In addition, the direct current resistance of the thin-film device can be stabilized, and the characteristics thereof can be improved.

In the method for manufacturing the thin-film device of the present invention, since the electrically conductive protective layer having a predetermined thickness is formed using the material in the step (b), in which the oxide layer formed on the surface of the material grows to a thickness of not more than a predetermined thickness, the oxide layer on the surface of the electrically conductive protection layer can be removed by ion-milling or the like in the step (c) so as to only polish away the electrically conductive protective layer without polishing the electrically conductive material layer. Consequently, since change in the volume of the electrically conductive material layer can be prevented, a thin-film device having the electrically conductive thin-film provided with uniform allowable current and direct current resistance can be formed, and uniform characteristics of the thin-film device can be easily obtained.

In addition, since bombardment ions, such as argon ions, used for ion-milling only collide with the electrically conductive protective layer and do not collide with the upper surface of the electrically conductive material layer, damage, such as residual stress, on the surface of the electrically conductive material layer can be avoided. As a result, an advantage of direct current resistance stabilization of the electrically conductive thin-film can be obtained.

The electrically conductive material layer is preferably formed in at least one layer composed of a material containing at least one element selected from copper and silver, and the electrically conductive protective layer is preferably formed in at least one layer composed of a material containing at least one element selected from the group consisting of nickel, phosphorus, palladium, platinum, boron, and tungsten.

When the electrically conductive material layer is formed in at least one layer by the material mentioned above, even though the oxide layer forms on the electrically conductive protective layer, it has been experimentally confirmed that the thickness of the oxide layer from the surface of the electrically conductive protective layer grows to a thickness of not more than a certain thickness.

For example, when the electrically conductive protective layer is a nickel layer, it is understood that the thickness of an oxide layer formed on the electrically conductive protective layer from the surface thereof will not exceed 3.0 nm. Consequently, by polishing away 3.0 nm or more of the electrically conductive protective layer from the surface thereof by ion-milling in the step (c), the oxide layer can be reliably removed.

In addition, allowable current and direct current resistance of the electrically conductive thin-film are also determined by a material used for the electrically conductive material layer. In the case in which the electrically conductive material layer is formed in at least one layer composed of a material containing at least one element selected from copper and silver, an electrically conductive thin-film having low direct current resistance and high allowable current can be formed.

In the case in which a coil layer for a thin-film device or the like is formed by using the electrically conductive thin-film of the present invention, when an electrically conductive material layer and an electrically conductive protective layer, which form the electrically conductive thin-film, are made of the electrically conductive non-magnetic material, such as nickel or copper, an influence to impedance of the coil layer can be prevented.

When the electrically conductive material layer is formed of an electrically conductive non-magnetic layer comprising at least one layer containing at least one element selected from copper and silver, and when the electrically conductive protective layer is formed of an electrically conductive non-magnetic layer containing at least one element selected from the group consisting of nickel, phosphorus, palladium, platinum, boron, and tungsten, stress can be reduced when the electrically conductive thin-film is formed by providing the electrically conductive protective layer on the surface of the electrically conductive material layer. As a result, the electrically conductive material layer and the electrically conductive protective layer are difficult to separate from each other.

When a plurality of removing steps of removing an oxide layer is performed in the step (c), the electrically conductive protective layer is preferably formed in the step (b) so as to have a thickness of not less than the total thickness to be removed in the plurality of removing steps.

When the present invention is practiced, the removing step of removing the oxide layer by ion-milling is not necessarily performed once.

For example, when the coil layer of the inductive head is formed, a removing step is performed to remove an oxide layer formed on a coil layer at the same time to remove an unwanted coil base layer, and in addition, when an opening is formed, which is formed in an insulating layer formed on the coil layer and is used as a contact area between the coil layer and a lead layer, another removing step of removing an oxide layer formed on the surface of the coil layer exposed to the air in the opening may be performed. In the case as described above, in order to prevent the electrically conductive material layer beneath the electrically conductive protective layer from being polished, the electrically conductive protective layer is preferably formed to a thickness of not less than the total thickness to be removed by performing ion-milling twice.

In the method for manufacturing the thin-film device of the present invention, for example, when a thin-film magnetic head having a core layer to form a gap at an area thereof opposing a recording medium and a coil layer flatly coiled so as to induce a recording magnetic field to the core layer is formed, the coil layer and/or the coil layer having a lead portion integrally extending therefrom is formed in the step (a) and the step (b), and a lead layer and/or a bump, which is different from the coil layer, is formed as the electrical conductor by plating in the step (d).

DESCRIPTION OF THE PREFERRED EMBODIMENTS

Figure 1:
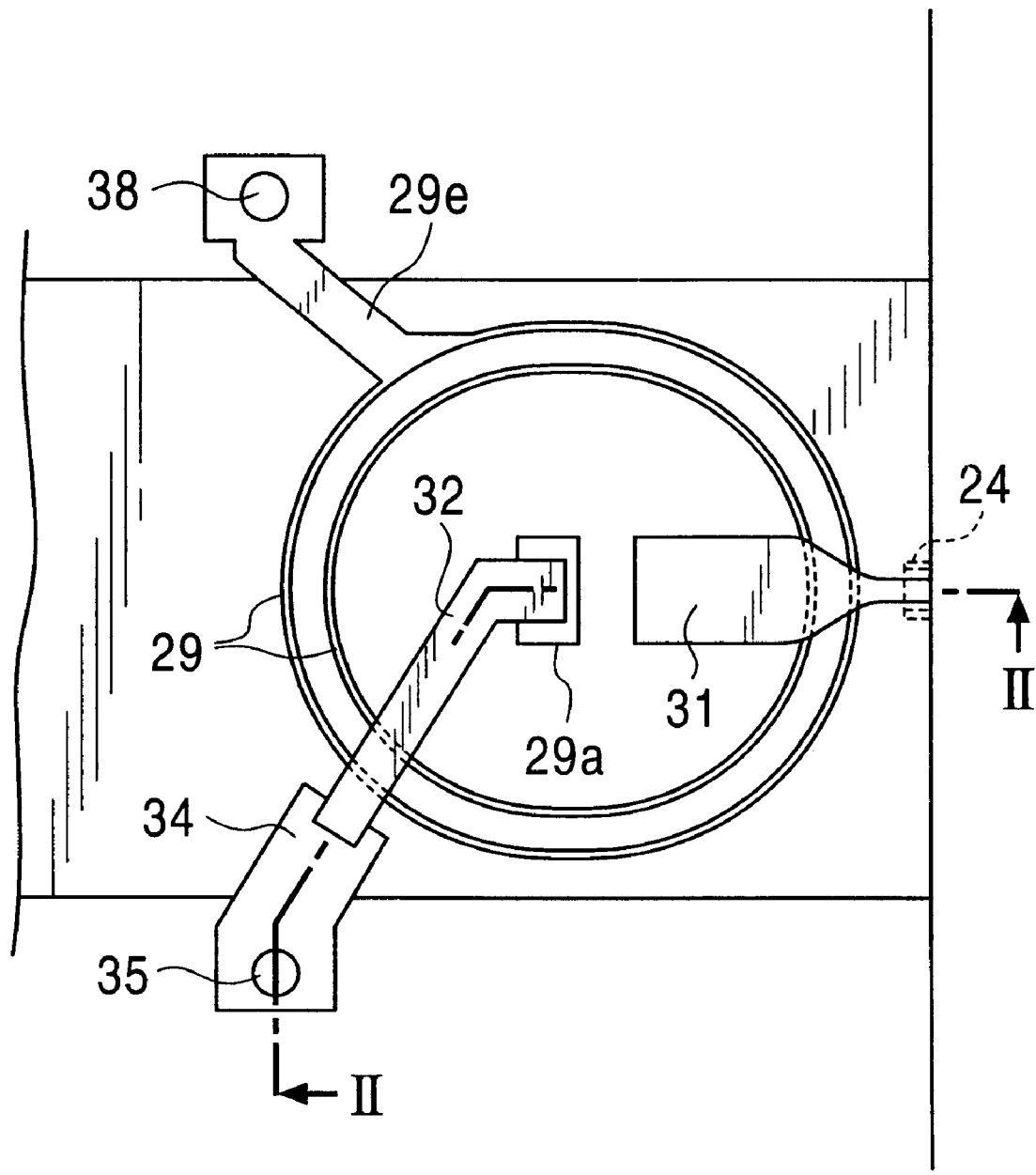
FIG. 1 is a plan view of a magnetoresistive (MR)/inductive hybrid thin-film magnetic head with an inductive head according to an embodiment of a thin-film device of the present invention.
Figure 2:
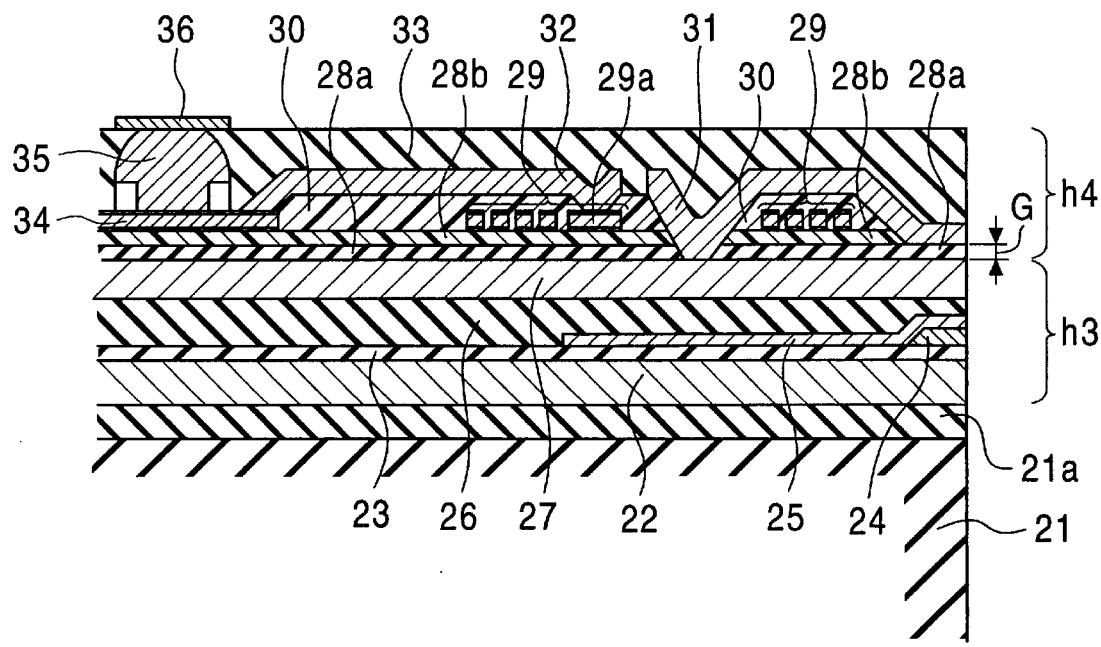
FIG. 2 is a cross-sectional view of the MR/inductive hybrid thin-film magnetic head taken along the line II—II in FIG. 1.

FIG. 1 is a plan view showing a so-called magnetoresistive (MR)/inductive hybrid head having a recording inductive head h4 disposed on a reading MR thin-film head h3. The inductive head h4 is an embodiment of a thin-film structure of the present invention. FIG. 2 is a cross-sectional view of the MR/inductive hybrid head taken along the line II—II in FIG. 1.

As shown in FIG. 2, the MR/thin-film magnetic head h3 is formed in a laminated structure composed of an alumina undercoat film 21a formed on a slider 21 composed of alumina-titanium-carbide, a lower shield layer 22, a lower gap layer 23, an MR element layer 24, an electrode layer 25, an upper gap layer 26, and an upper shield layer 27.

The recording inductive head h4 formed on the reading MR thin-film magnetic head h3 is formed in a laminated structure composed of a gap layer 28a, an insulating layer 28b, a coil layer 29, an insulating layer 30, an upper core layer 31, a lead layer 32, and an insulating layer 33, on a lower core layer 27 which is also used as the upper shield layer 27.

A front end of the gap layer 28a, which is disposed between the lower core layer 27 and the upper core layer 31 and opposes a recording medium, forms a magnetic gap G. The coil layer 29 is flatly coiled on the insulating layer 28b and induces a recording magnetic field to the lower core layer 27 and the upper core layer 31. In FIG. 1, for ease of illustration in the figure, the coil layer is drawn as concentric circles instead of as a coil. This coil layer 29 is an electrically conductive thin-film for the thin-film device of the present invention.

The coil layer 29 is in electrical contact with the lead layer 32 at a central edge 29a of the coil layer 29, and the lead layer 32 is connected to a bump 35 and a bonding pad 36 at the other edge of the lead layer 32 opposite to the edge connected to the central edge 29a of the coil layer 29 via an elevating layer 34 which is simultaneously formed with the coil layer 29. The lead layer 32 is an electrical conductor of the thin-film device of the present invention.

The gap layer 28a and the insulating layer 33 of the inductive head h4 are composed of an insulating material, such as $Al_2O_3$ or $SiO_2$, the insulating layer 28b and the insulating layer 30 are composed of resists, and the lower core layer 27, the upper core layer 31, and the lead layer 32 are composed of an electrically conductive soft magnetic material, such as permalloy.

Figure 3:
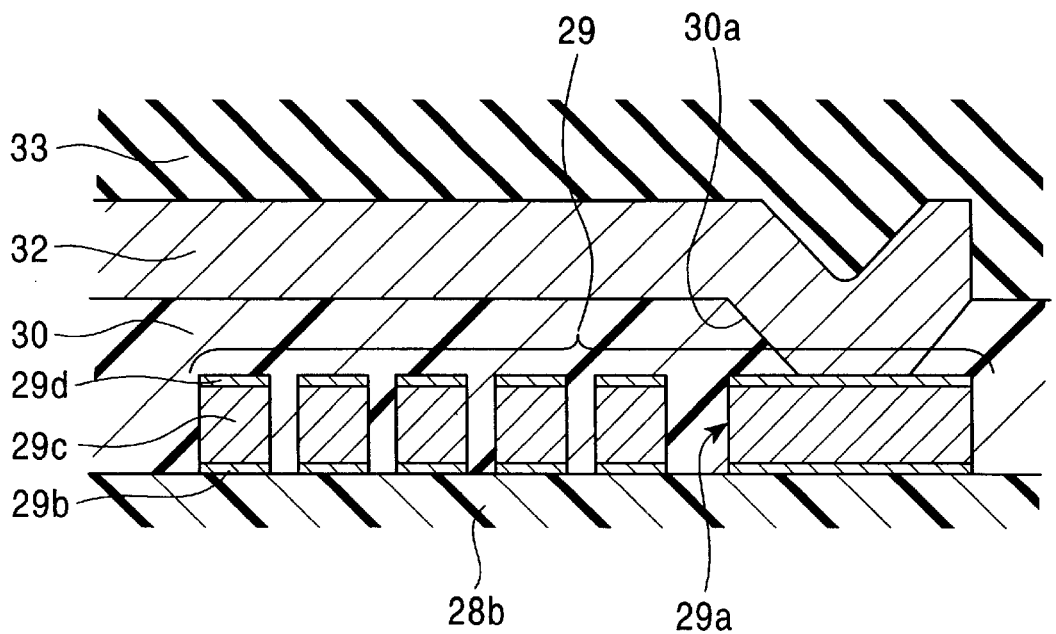
FIG. 3 is an enlarged partial cross-sectional view of a contact area between a coil layer and a lead layer of the inductive head of the MR/inductive hybrid thin-film magnetic head in FIG. 2.

FIG. 3 is an enlarged cross-sectional view of a part of the contact area between the coil layer 29 and the lead layer 32 of the inductive head h4 for the MR/inductive hybrid thin-film magnetic head shown in FIG. 2.

The coil layer 29 is provided on a coil base layer 29b formed on the insulating layer 28b, and is composed of a copper layer 29c which is an electrically conductive material layer and a nickel layer having a predetermined thickness which is an electrically conductive protective layer, which are sequentially formed by flame plating on the coil base layer 29b composed of titanium and copper in a laminated structure. When the electrically conductive material layer is the copper layer 29c, direct current resistance of the coil layer 29 can be reduced, and allowable current thereof can be increased.

The electrically conductive material layer is not limited to the copper layer 29c, and may be an electrically conductive non-magnetic layer comprising at least one layer containing at least one element selected from silver and copper.

In the embodiment, the nickel layer 29d is formed as the electrically conductive protective layer. It has been experimentally confirmed that an oxide layer formed on the nickel layer 29d at room temperature or an elevated temperature does not grow to 3.0 nm or more. Consequently, when 3.0 nm or more from the surface of the nickel layer 29d is polished away by dry etching, such as by ion-milling, the oxide layer can be reliably removed from the nickel layer 29d.

In addition, the electrically conductive protective layer may be an electrically conductive non-magnetic layer comprising at least one layer containing at least one element selected from the group consisting of nickel, phosphorus, palladium, platinum, boron, and tungsten.

In the embodiment, the lead layer 32 is in contact with the area at which the oxide layer on the nickel layer 29d of the coil layer 29 is removed. Accordingly, the cohesion and electrical conductance between the coil layer 29 and the lead layer 32 can be improved, and hence, connection failures of the inductive head h4 can be reduced, direct current resistance can be stabilized, and recording characteristics can be improved.

Furthermore, when the oxide layer on the nickel layer 29d can be reliably removed, the cohesion between the coil layer 29 and the insulating layer 30 can also be improved.

In the embodiment, a predetermined thickness of the nickel layer 29d is set to be 200 to 600 nm. Meanwhile, the oxide layer formed on the nickel layer 29d will not grow to 3.0 nm or more from the surface thereof. Consequently, in the case in which the oxide layer on the surface of the nickel layer 29d is removed by ion-milling or the like, only the nickel layer 29d is polished away so that the copper layer 29c is not polished. That is, change in the volume of the copper layer 29c can be avoided. Since the volume of the copper layer 29c is a parameter which determines allowable current and direct current resistance of the coil layer 29, when the change in the volume of the copper layer 29c is avoided, an inductive head h4 provided with the coil layer 29 having uniform allowable current and direct current resistance can be formed and characteristics of the inductive head h4 can be maintained at the uniform level.

Since nickel and copper are electrically conductive non-magnetic materials, impedance of the coil layer 29 will not be influenced. In addition, when the coil layer 29 is formed by providing the nickel layer 29d on the copper layer 29c, stress therebetween can be reduced, and as a result, the nickel layer 29d is difficult to separate from the copper layer 29c.

In this embodiment, the nickel layer 29d, i.e., an electrically conductive protective layer, is formed on the entire surface of the copper layer 29c, i.e., an electrically conductive material layer which forms the coil layer 29. Consequently, improvement in the cohesion between the coil layer 29 and the insulating layer 30, and improvements in the cohesion and electrical conduction between the central edge 20a of the coil layer 29 and the lead layer 32 are anticipated, and hence, direct current resistance of the inductive head can be stabilized.

However, the nickel layer may partly cover the surface of the copper layer 29c forming the coil layer 29 instead of covering the entire surface of the copper layer 29c, for example, an area at which the copper layer 29c is present in the opening 30a in the insulating layer 30 covering the coil layer 29, i.e., an area which is a connection area between the central edge 29a of the coil layer 29 and the lead layer 32. In this case, degradations in the cohesion and electrical conduction between the central edge 29a of the coil layer 29 and the lead layer 32 can be prevented, connection failure of the inductive head h4 can be reduced, direct current resistance can be stabilized, and recording characteristics can be improved.

FIGS. 4 to 9 are cross-sectional views of the inductive head h4 in a manufacturing process of the MR/inductive hybrid thin-film magnetic head shown in FIGS. 1 to 3.

Figure 4:
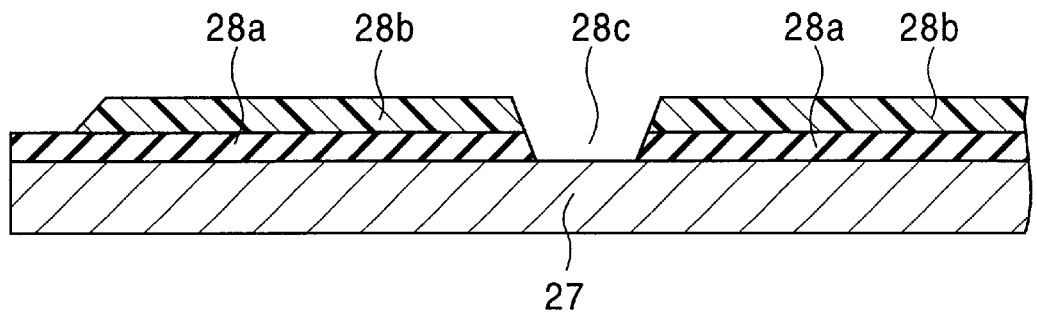
FIG. 4 is a cross-sectional view showing a state of a gap layer and an insulating layer formed in a laminated structure in a manufacturing step of the inductive head of the MR/inductive hybrid thin-film magnetic head in FIGS. 1 to 3.

FIG. 4 is a cross-sectional view showing a state of the gap layer 28a composed of $Al_2O_3$ or $SiO_2$ and the insulating layer 28b composed of the hard-baked resist in a laminated structure formed on the lower core layer 27. In addition, the gap layer 28a and the insulating layer 28b are provided with an opening 28c in order that the upper core layer 31 and the lower core layer 27 will be electrically connected to each other in a subsequent step.

Figure 5:
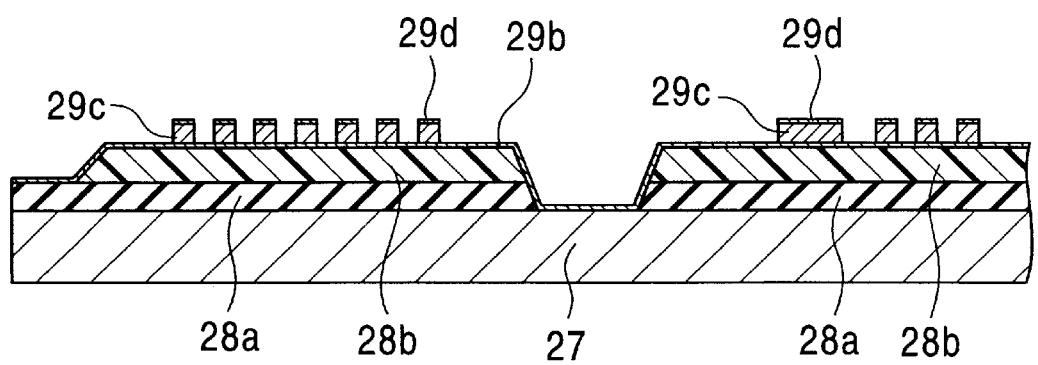
FIG. 5 is a cross-sectional view showing a state of a coil base layer, a copper layer, and a nickel layer formed in a laminated structure on the insulating layer in FIG. 4.

FIG. 5 shows a state of the copper layer 29c, i.e., an electrically conductive material layer, and the nickel layer 29d, i.e., an electrically conductive protective layer, formed by flame plating on the insulating layer 28b in FIG. 4 via the coil base layer 29b composed of titanium and copper in a laminated structure.

After forming the copper layer 29c by flame plating, the nickel layer 29d of the electrically conductive protective layer is continuously formed on the copper layer 29c by flame plating using the same frame as was used for the formation of the copper layer 29c.

Figure 6:
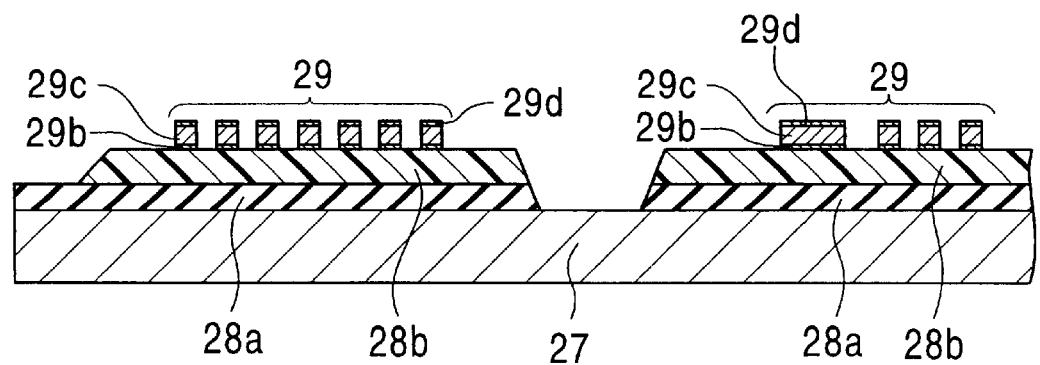
FIG. 6 is a cross-sectional view showing a state of a coil layer formed after removing an unwanted coil base layer exposed by the copper layer provided with the nickel layer thereon in FIG. 5.

Furthermore, when the coil base layer 29b exposed by the copper layer 29c provided with the nickel layer 29d thereon is removed by dry etching, such as by ion-milling, using a noble gas, such as argon ions, the coil layer 29 of the electrically conductive thin-film is formed as shown in FIG. 6.

In addition, by the dry etching described above, the oxide layer formed on the surface of the nickel layer 29d can also be removed.

As has thus been described, in the coil layer 29 of the embodiment, since the copper layer 29c is protected by the nickel layer 29d, removal of the upper surface of the copper layer in addition to the removal of the coil base layer 29b can be avoided in the step for removing the unwanted coil base layer 29b by dry etching as described above.

Consequently, change in the volume of the copper layer 29c can be prevented, an inductive head provided with the coil layer 29 having a uniform allowable current and direct current resistance can be formed, and hence, stable characteristics of the inductive head can be easily maintained.

In addition, when dry etching is performed, bombardment by argon ions on the upper surface of the copper layer 29c can be avoided, and therefore, damage such as residual stress in the upper surface of the copper layer 29c can be prevented.

The coil layer 29 is flatly coiled on the insulating layer 28b so as to induce a recording magnetic field to the upper core layer 31 and the lower core layer 27 of the inductive head h4 shown in FIG. 2. In the embodiment, the thickness of the nickel layer 29d is 200 to 600 nm.

When the electrically conductive material layer is composed of copper as is in the embodiment, direct current resistance of the coil layer 29 can be reduced and allowable current thereof can be increased.

In addition, since nickel and copper are electrically conductive non-magnetic materials, the impedance of the coil layer 29 is not influenced. It is also easy to reduce the stress between the copper layer 29c and the nickel layer 29d so that the nickel layer 29d is difficult to separate from the copper layer 29c.

Instead of the copper layer 29c, an electrically conductive non-magnetic layer formed in at least one layer containing at least one element selected from silver and copper may be formed.

In addition, instead of the nickel layer 29d, an electrically conductive non-magnetic layer formed in at least one layer containing at least one element selected from the group consisting of nickel, phosphorus, palladium, platinum, boron, and tungsten may be formed.

The oxide layer formed on the nickel layer 29d will not grow to 3.0 nm or more at room temperature or an elevated temperature. In the embodiment, an oxide layer of 200 to 600 nm is formed. Consequently, even though the oxide layer forms on the surface of the nickel layer 29d, by removing not less than 3.0 nm from the surface of the nickel layer 29d by dry etching, such as by ion-milling, the oxide layer on the nickel layer 29d can be reliably removed. In the embodiment, 4.0 to 9.0 nm of the nickel layer 29d from the surface thereof is polished away. Hence, the cohesion between the coil layer 29 and the insulating layer 30 is improved.

In the embodiment, the nickel layer 29d is only polished away by ion-milling. Consequently, the volume of the copper layer 29c below the nickel layer 29d does not change, and hence, an inductive head provided with the coil layer 29 having uniform direct current resistance and allowable current can be formed.

In the embodiment, the nickel layer 29d is formed on the entire surface of the copper layer 29c which forms the coil layer 29. However, the nickel layer 29d may partly cover the surface of the copper layer 29c, for example, an area at which the coil layer 29c is present in the opening 30a in the insulating layer 30, i.e., an area at which the central edge 29a of the coil layer 29 is present.

Figure 7:
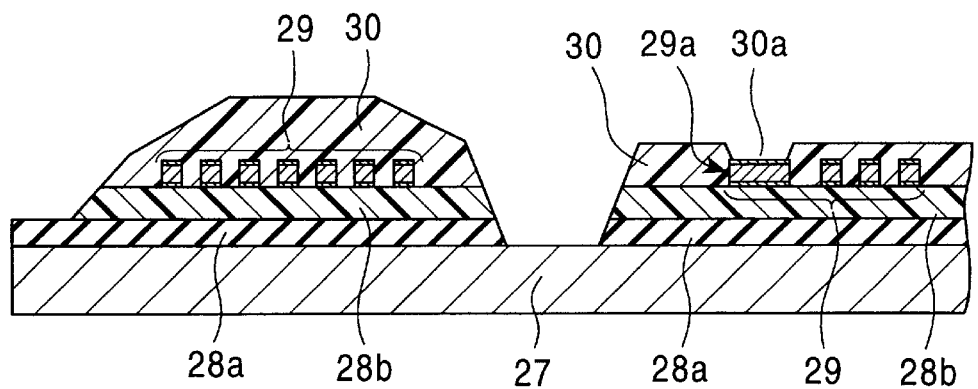
FIG. 7 is a cross-sectional view showing a state of an insulating layer formed on the coil layer in FIG. 6.

After removing the oxide layer from the nickel layer 29d, the insulating layer 30 is formed on the coil layer 29 as shown in FIG. 7. In a sequential step, the opening 30a is provided in the insulating layer 30 in order to contact the central edge 29a of the coil layer 29 with the lead layer 32.

Between the formation of the opening 30a and the formation of a plating base layer 37 by sputtering to form the upper core layer 31 and the lead layer 32 by plating, specifically, when the surface of the insulating layer 30 is cured by heat or ultraviolet rays, an oxide layer may form on the nickel layer 29d at the central edge 29a of the coil layer 29 exposed to the air in the opening 30a. Then, the oxide layer is removed by ion-milling or the like.

Since the oxide layer forms on the nickel layer 29d, the thickness of the oxide layer will not grow to 3.0 nm or more from the surface of the nickel layer 29d.

Consequently, by polishing away 3.0 nm or more of the nickel layer 29d from the surface thereof, the oxide layer can be reliably removed from the nickel layer 29d. In the embodiment, the thickness removed from the surface of the nickel layer 29d by ion-milling is set to be 4.0 to 9.0 nm.

In the case in which a plurality of removing steps for removing the oxide layer from the nickel layer 29d by ion-milling are performed, as described above, the nickel layer 29d may be formed in the forming step therefor at a thickness greater than the total thickness to be removed in the plurality of removing steps. Accordingly, polishing away of the copper layer 29c is prevented.

In the embodiment, ion-milling is performed so as to remove 4.0 to 9.0 nm of the nickel layer 29d from the surface thereof on which the oxide layer formed. The total thickness removed from the surface of the nickel layer by performing ion-milling twice, as is in the embodiment, is 8.0 to 18.0 nm. In the embodiment, the thickness of the nickel layer is set to be 200 to 600 nm, so that the copper layer 29c will not be polished away by ion-milling twice.

Figure 8:
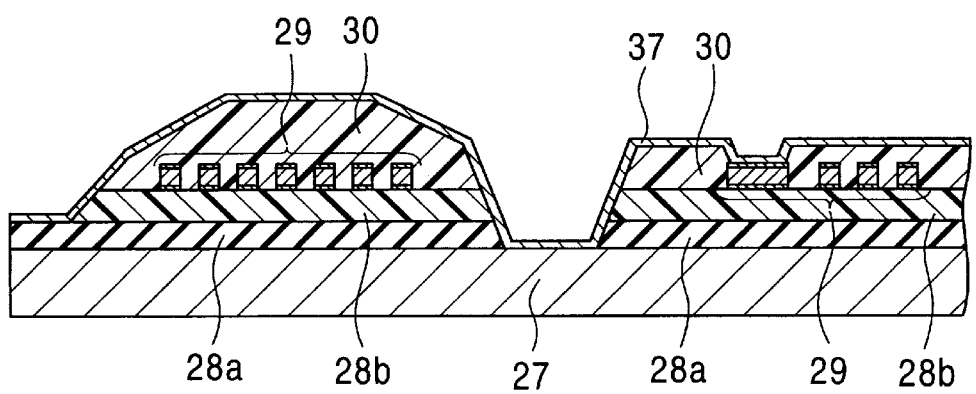
FIG. 8 is a cross-sectional view showing a state of a plating base layer formed on the insulating layer in FIG. 7.

Next, as shown in FIG. 8, the plating base layer 37 (not shown in FIGS. 2 and 3) is formed on the insulating layer 30 by sputtering to form the upper core layer 31 and the lead layer 32 by plating in the following step. The plating base layer 37 is made of the same material, such as permalloy, as is used for the upper core layer 31 and the lead layer 32.

Figure 9:
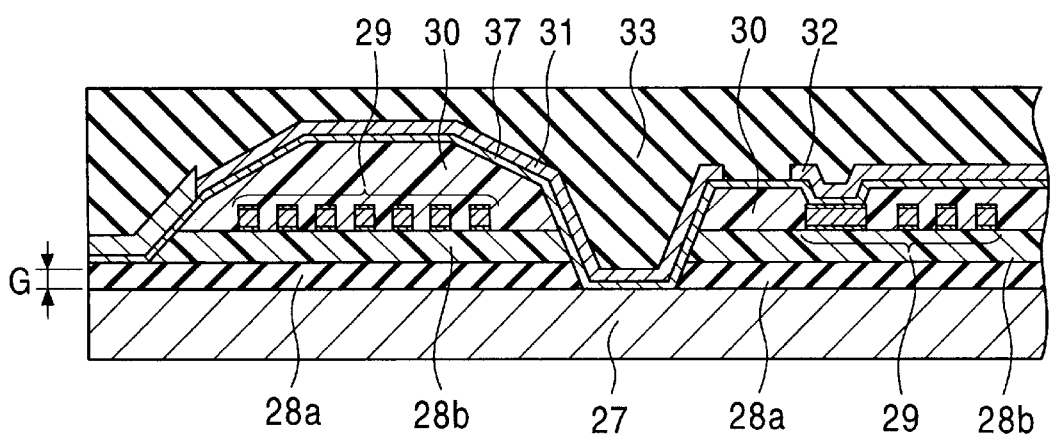
FIG. 9 is a cross-sectional view showing a completed state of the inductive head in a laminated structure, in which an upper core layer, a lead layer, and an insulating layer are formed in a laminated structure on the plating base layer in FIG. 8.
Figure 10:
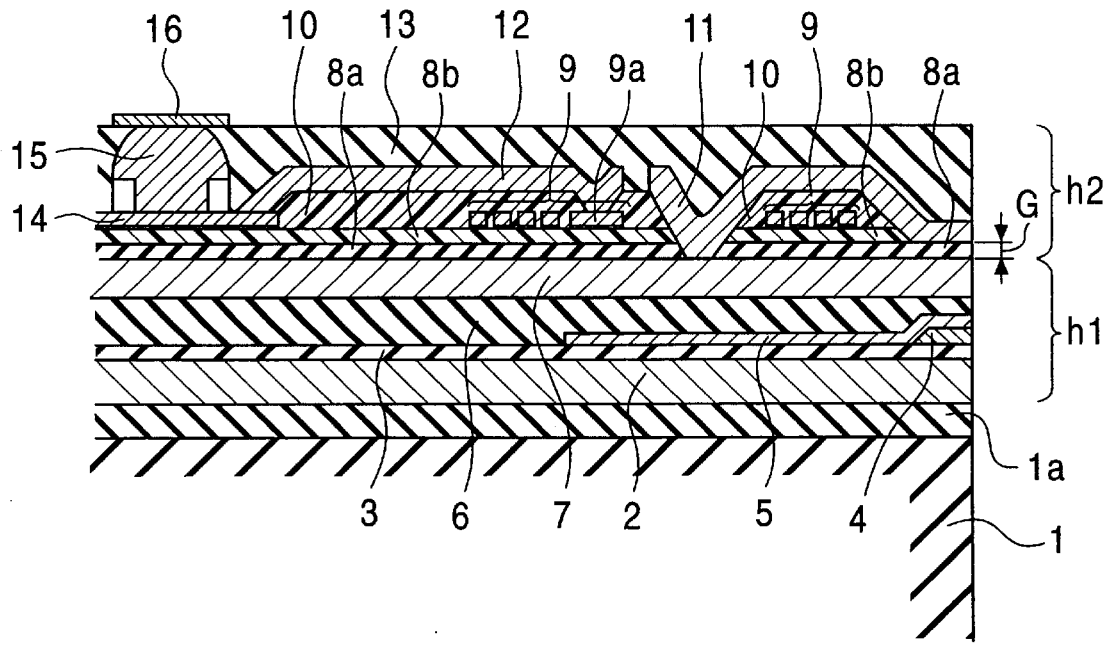
FIG. 10 is a cross-sectional view of a conventional MR/inductive hybrid thin-film magnetic head.
Figure 11:
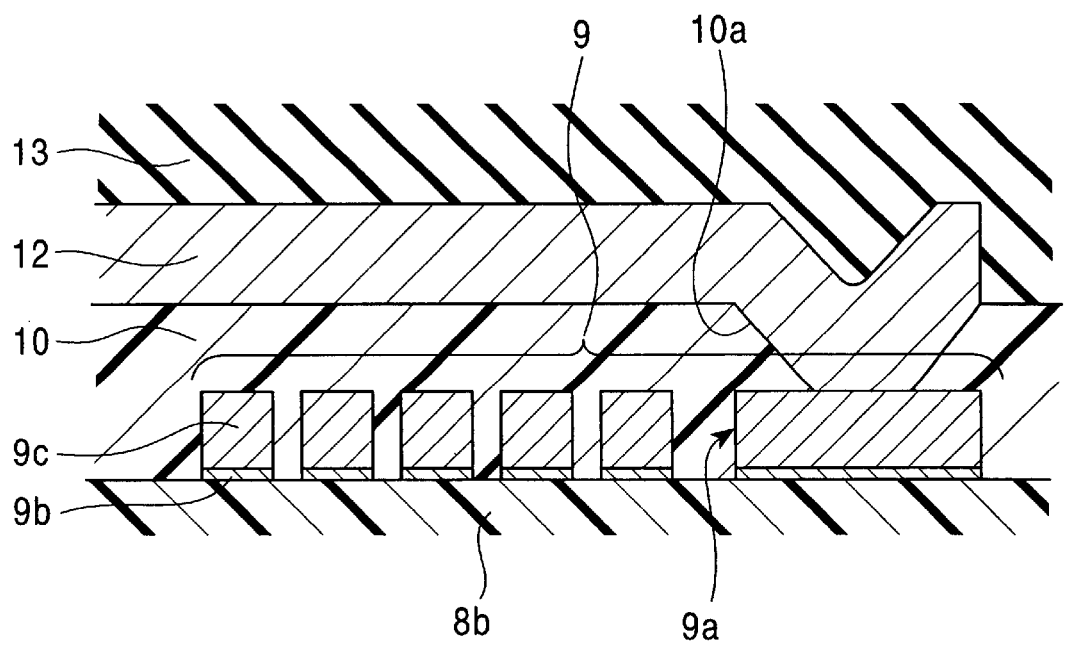
FIG. 11 is an enlarged partial cross-sectional view of a contact area between a coil layer and a lead layer of an inductive head of a conventional MR/inductive hybrid thin-film magnetic head.
Figure 12:
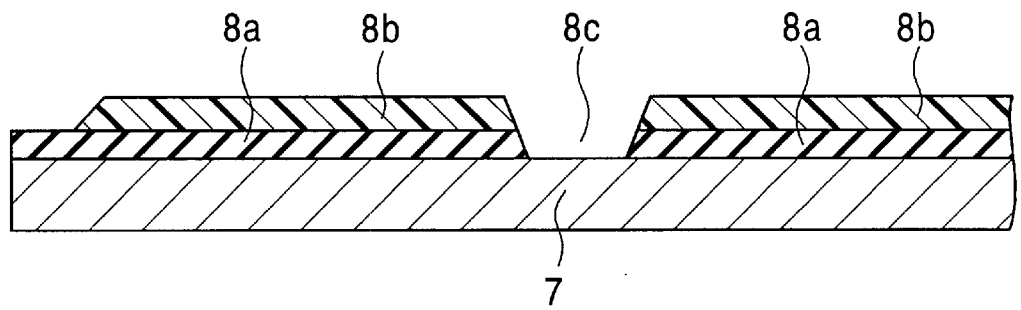
FIG. 12 is a cross-sectional view showing a state of a gap layer and an insulating layer formed in a laminated structure in a manufacturing step of the inductive head of the MR/inductive hybrid thin-film magnetic head in FIGS. 10 to 11.
Figure 13:
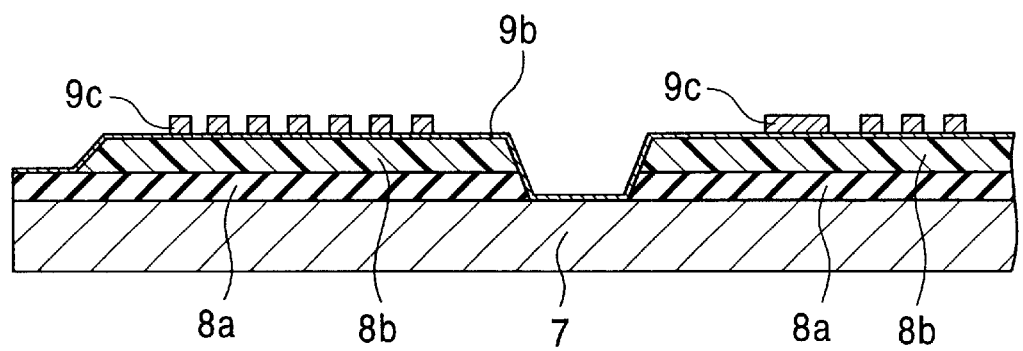
FIG. 13 is a cross-sectional view showing a state of a coil base layer and a copper layer formed in a laminated structure on the insulating layer in FIG. 12.
Figure 14:
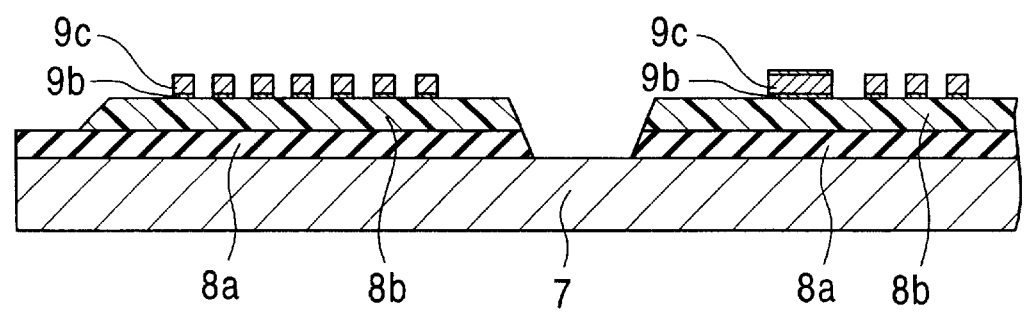
FIG. 14 is a cross-sectional view showing a state of a coil layer formed after removing the coil base layer in FIG. 13.
Figure 15:
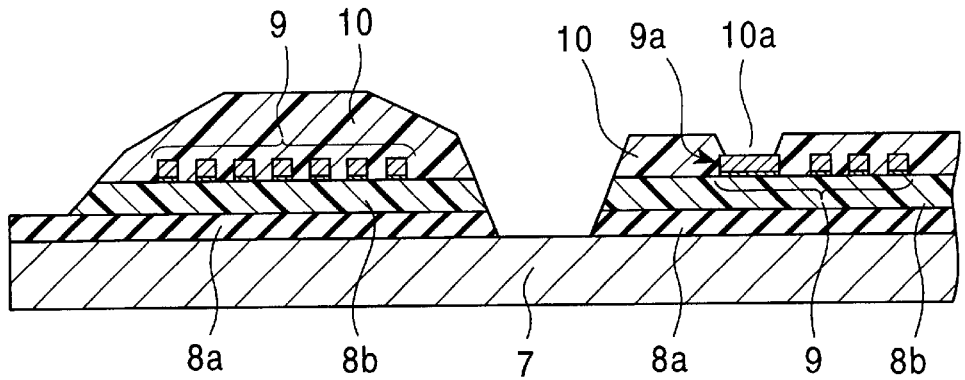
FIG. 15 is a cross-sectional view showing a state of an insulating layer formed on the coil layer in FIG. 14.
Figure 16:
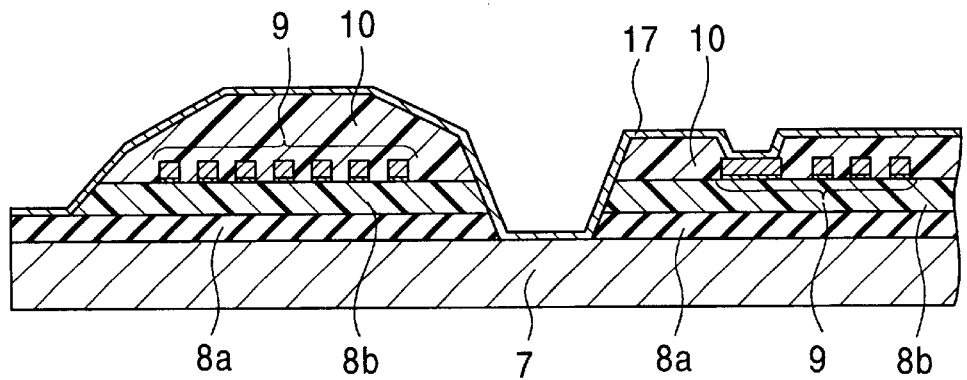
FIG. 16 is a cross-sectional view showing a state of a plating base layer formed on the insulating layer in FIG. 15.
Figure 17:
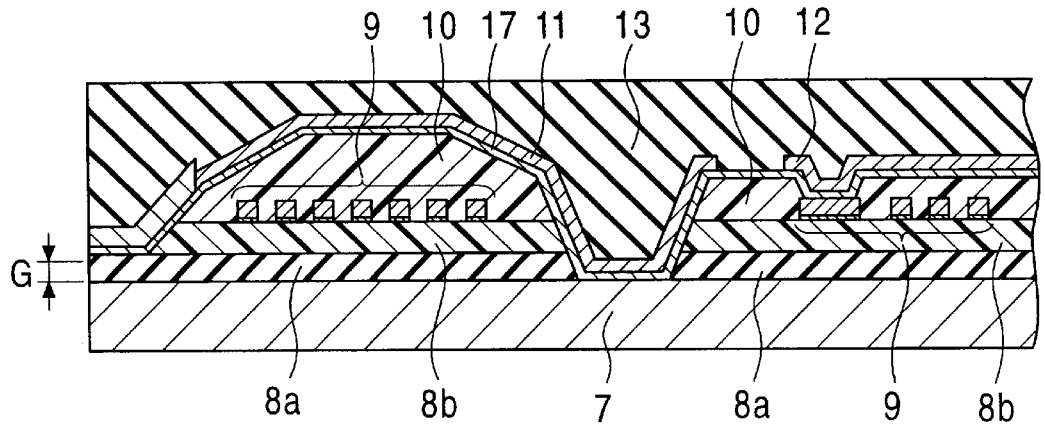
FIG. 17 is a cross-sectional view showing a completed state of the inductive head in a laminated structure, in which an upper core layer, a lead layer, and an insulating layer are formed on the plating base layer in FIG. 16.

In addition, the upper core layer 31 and the lead layer 32 are simultaneously formed on the plating base layer 37 by plating using permalloy, and then the upper surfaces of the upper core layer 31 and the lead layer 32 are covered with the insulating layer 33. The front end of the gap layer 28a which is disposed between the lower core layer 27 and the upper core layer 31 and opposes a recording medium forms the magnetic gap G. FIG. 9 is a cross-sectional view of a completed laminated structure of the inductive head h4.

In the embodiment, the plating base layer 37 is formed on the surface at which the oxide layer is reliably removed from the central edge 29a of the coil layer 29, which is exposed to the air in the opening 30a. Consequently, the cohesion and electrical conduction between the coil layer 29 and the plating base layer 37 for the lead layer 32 can be improved. That is, the cohesion and electrical conduction between the coil layer 29, i.e., the electrically conductive thin-film, and the lead layer 32, i.e., the electrical conductor, can be improved. As a result, connection failures of the inductive head h4 are reduced, the direct current resistance is stabilized, and the recording characteristics are improved.

In addition, a lead portion 29e extending from the periphery of the coil layer 29 shown in FIG. 1 is simultaneously formed in the same step as in the step the coil layer is formed. That is, the lead portion 29e is also composed of a copper layer of an electrically conductive material layer and a nickel layer of an electrically conductive protective layer provided thereon.

A bump 38, which is an electrical conductor, is formed on the surface of the lead portion 29e by plating and is in electrical contact therewith. Between the formation of the lead portion 29e and the formation of the bump to be in electrical contact therewith, an oxide layer may form on the lead portion 29e.

The surface of the lead portion 29e is a nickel layer, and hence, the oxide layer formed on the lead portion 29e will not grow to 3.0 nm or more from the surface of the nickel layer. Consequently, by polishing away not less than 3.0 nm of the nickel layer from the surface thereof by ion-milling or the like, the oxide layer can be reliably removed from the lead portion 29e. As a result, the cohesion and electrical conduction between the lead portion 29e and the bump 38 can be improved.

The electrically conductive thin-film of the present invention can not only be applied in the construction of the coil layer of the inductive head for the MR/inductive hybrid thin-film magnetic head, but can also be applied in the construction of coil layers for general electrically conductive thin-films for thin-film devices such as thin-film inductors and thin-film transformers.

As has thus been described in detail, in the thin-film device of the present invention, the electrically conductive thin-film, such as the coil layer, comprises the electrically conductive material layer and the electrically conductive protective layer having a predetermined thickness, and the electrically conductive protective layer is composed of a material, in which the oxide layer formed on the material at room temperature or an elevated temperature will not grow to a thickness of not more than that of the electrically conductive protective layer. In the step for forming the thin-film device, even though the oxide layer forms on the surface of the electrically conductive thin-film, the oxide layer can be reliably removed from the electrically conductive thin-film by ion-milling or the like.

Furthermore, according to the method for forming the thin-film device of the present invention, the oxide layer formed on the electrically conductive thin-film can be reliably removed in a step of removing the oxide layer. In addition, only the electrically conductive protective layer is polished, and the electrically conductive material layer is not polished, so that allowable current and direct current resistance of the electrically conductive thin-film will not change and characteristics of the thin-film device can be stabilized.

What is claimed is:

1. A thin-film device comprising:
   an electrically conductive thin-film; and
   an electrical conductor in contact with a surface of the electrically conductive thin-film,
   wherein the electrically conductive thin-film comprises an electrically conductive material layer and an electrically conductive protective layer having a predetermined thickness formed on the electrically conductive material layer,
   the electrical conductor is in contact with an area at which the oxide layer on the electrically conductive protective layer is removed,
   an insulating layer is in direct contact with the electrically conductive protective layer to cover the electrically conductive protective layer, and
   the electrically conductive protective layer comprises at least one element selected from the group consisting of Ni, P, Pd, Pt, B, and W.

2. A thin-film device according to claim 1,
   wherein the electrically conductive material layer and the electrically conductive protective layer are formed by plating.

3. A thin-film device according to claim 2,
wherein the electrically conductive material layer is an electrically conductive non-magnetic layer comprising at least one layer containing at least one element selected from copper and silver, and the electrically conductive protective layer is an electrically conductive non-magnetic layer comprising at least one layer containing at least one element selected from the group consisting of nickel, phosphorus, palladium, platinum, boron, and tungsten.

4. A thin-film device according to claim 1,
wherein the electrically conductive protective layer is formed on the entire surface of the electrically conductive material layer.

5. A thin-film device according to claim 1, further comprising an insulating layer having an opening formed on the electrically conductive thin-film, wherein the electrically conductive protective layer is only formed on the electrically conductive material layer in the opening in the insulating layer.

6. A thin-film device according to claim 1,
wherein the electrically conductive thin-film is at least one of a coil layer and a lead portion integrally extending therefrom in a thin-film magnetic head comprising a core layer to form a gap at an area of the core layer opposing a recording medium and the coil layer flatly coiled to induce a recording magnetic field to the core layer, and the electrical conductor is in contact with at least one of the coil layer and the lead portion.

7. A thin film device according to claim 1, wherein the insulating layer is a resist baked by ultraviolet rays or heat.

* * * * *

UNITED STATES PATENT AND TRADEMARK OFFICE
CERTIFICATE OF CORRECTION

PATENT NO.   : 6,490,128 B1
DATED        : December 3, 2002
INVENTOR(S)  : Kiyoshi Sato It is certified that error appears in the above-identified patent and that said Letters Patent is hereby corrected as shown below:

<u>Column 14,</u>
Line 56, delete "the oxide" and substitute -- an oxide -- in its place.

<u>Column 15,</u>
Line 17, delete "an insulating" and substitute -- the insulating -- in its place.

Signed and Sealed this

Twenty-fifth Day of March, 2003

JAMES E. ROGAN
*Director of the United States Patent and Trademark Office*